No. 811,937. PATENTED FEB. 6, 1906.
F. H. LINDENBERG.
CLOSET TANK.
APPLICATION FILED JUNE 8, 1903.

WITNESSES: S. Edwin Ward, A. L. Phelps

INVENTOR Frank H. Lindenberg
BY Shepherd
ATTORNEY

UNITED STATES PATENT OFFICE.

FRANK H. LINDENBERG, OF COLUMBUS, OHIO, ASSIGNOR TO THE CO-LUMBUS BRASS COMPANY, OF COLUMBUS, OHIO, A CORPORATION OF OHIO.

CLOSET-TANK.

No. 811,937.

Specification of Letters Patent.

Patented Feb. 6, 1906.

Application filed June 8, 1903. Serial No. 160,594.

*To all whom it may concern:*

Be it known that I, FRANK H. LINDENBERG, a citizen of the United States, residing at Columbus, in the county of Franklin and State of Ohio, have invented a certain new and useful Improvement in Closet-Tanks, of which the following is a specification.

My invention relates to the improvement of water-closet tanks, and has particular relation to the means for securing the sheet-metal lining thereof to the wooden body.

The object of my invention is to provide improved means for connecting the sheet-copper or other metallic lining of a tank of this kind with the body of the tank, and by such connection to permit of any warping or shrinkage in the wood of the tank without injury to the metallic lining or without separating the same at its seams or pulling said lining away from the bottom of the tank. This object I accomplish in the manner illustrated in the accompanying drawings, in which—

Figure 1:
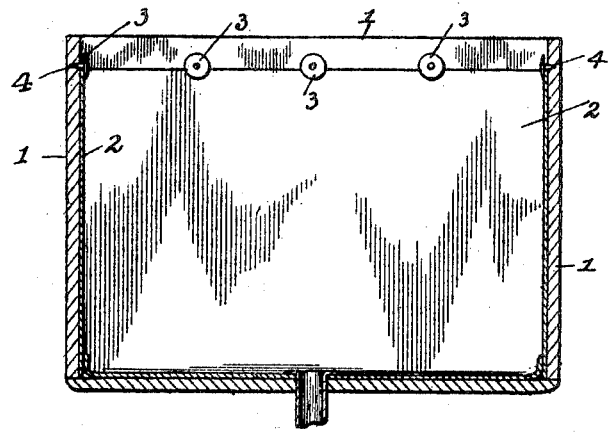
Figures 2, 3:
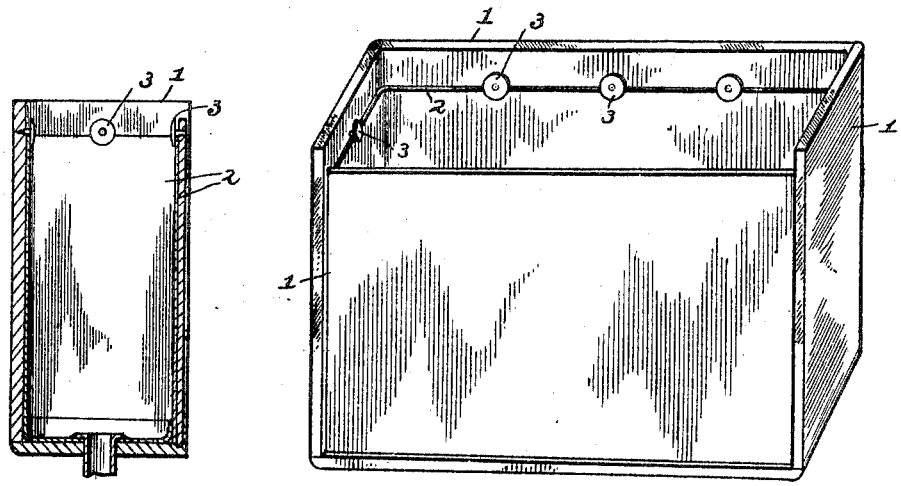

Figure 1 is a central vertical longitudinal section of a tank having my improvement in connection therewith. Fig. 2 is a transverse section of the same, and Fig. 3 is a view in perspective of the tank.

Similar numerals refer to similar parts throughout the several views.

It has been customary to rigidly secure the sheet-copper or other metallic lining to the body of a closet-tank by nailing, tacking, or otherwise permanently connecting the upper portion of the lining sides and ends with the wooden tank-body; but experience has shown that the tendency of the sides and ends of the wooden body of the tank to bulge or warp from dampness or other causes results in straining the metallic lining and in pulling the same away from the bottom of the tank or breaking the lining at the seams. To overcome this difficulty, I have provided the construction herein shown and described.

In carrying out my invention the tank 1, which is of any suitable form or construction, is provided with the usual sheet-metal lining 2, the sides and ends of which extend to near the tops of the sides and ends of the tank-body. In securing this lining in place I employ a desired number of disks or suitably-shaped plates 3, preferably metal, through the centers of which are driven or with which are formed tack or spur-like projections 4, the latter being driven into the inner surface of the wooden body of the tank, so that the upper edges of the sides and ends of the lining are adjacent to the under sides of said tacks, while said disks or plates 3 have their lower portions embracing or overlapping the upper edges of the lining and serving to hold the latter in desirable contact with the inner surface of the tank. By this means of connection of the lining and tank it will be understood that the usual outward or upward bulge or swelling of the wood from the sides or ends of the tank may take place without imparting sufficient pull on the lining to draw the latter out of its seat in the tank or to cause a separation of said lining. It will readily be seen that this result is due to the fact that the connection between the lining and tank is not rigid and that the edge of the lining has sufficient play or sliding movement beneath the overlapping portions of the disks or plates 3 to permit of an upward or outward bulging of the wood without drawing upon the lining.

Having now fully described my invention, what I claim, and desire to secure by Letters Patent, is—

A tank, comprising a wooden shell, an unattached sheet-metal lining for the bottom and inner sides of said shell, means on said shell for holding the upper edge of said lining with freedom of vertical movement in respect to the said shell and holding means, and space between said upper edge and confining means for said vertical movement.

FRANK H. LINDENBERG.

In presence of—
A. L. PHELPS,
W. L. MORROW